Patented Aug. 11, 1942

2,292,611

UNITED STATES PATENT OFFICE 2,292,611

POLYMERIZED CASHEW NUT SHELL LIQUID RESIDUE

Solomon Caplan, New York, N. Y., assignor to The Harvel Corporation, a corporation of New Jersey No Drawing. Application September 8, 1939, Serial No. 293,927

2 Claims. (Cl. 260—46)

The present invention relates generally to methods and steps for the ploymerization of phenols having unsaturated side chain substituents on the phenol nucleus whether synthetic or of natural sources such as materials of this kind obtained or derived from the Anacardium genus of the Anacardiaceae family and including cashew nut shell liquid, marking nut shell liquid, Japanese lac and unsaturated side chain phenolic products obtained or derived from these materials such as anacardic acid, cardanol, cardol, urushiol, and the phenolic constituents of marking nut shell liquid; and the present invention relates more particularly to methods and steps for the polymerization of the above identified materials and products by the use of monoalkyl acid sulphates and dialkyl sulphates, with the aid of heat.

The present application is a continuation in part of my copending application Serial Number 109,470, filed November 6, 1936, allowed January 24, 1939, and issued Oct. 17, 1939, Patent No. 2,176,059.

The products of the present invention are generally described hereby as those obtained by the method of treating cashew nut shell liquid which has been destructively distilled with steam to remove from 25% to 75% thereof as distillate and to leave a residue which comprises heating said residue with from about 1% to about 10% of its weight of dialkyl sulphate to produce polymerization.

The present invention is a departure from the invention described in Patent Number 1,725,793 of M. T. Harvey who uses strong acids such as sulphuric acid, among other materials, for the treatment of cashew nut shell liquid; and it is an object of the present invention to obtain a slower polymerizing reaction than is given by strong acids, for the purposes of facilitating the handling of the material being polymerized, as examples, to allow time to pour large batches from mixing kettles into curing pans, also to get the sulphate thoroughly and uniformly dispersed throughout the material to be treated before reaction is initiated, and without the use of solvents which do not enter into the reaction and which eventually have to be removed.

The present invention is especially advantageous in making polymerized products for electrical insulation in that it eliminates the possibility of the occlusion of water or unpolymerized material in the polymerized product, such as may occur when water is used to dilute sulphuric acid employed for polymerizing to the solid state.

Also, monoalkyl acid sulphates, dialkyl sulphates, and sulphuric acid can be used at different steps of the polymerization. For example, sulphuric acid can be used for a preliminary polymerization and used in such predetermined quantity as to produce a polymerized product which is liquid, after which a mono- or di-alkyl sulphate is mixed in and used to bring the treated material to the finally desired state of polymerization, such as to an intermediate state or to the rubbery state.

Also either mono- and di-alkyl sulphate can also be used for the precipitation of metal radicles from cashew nut shell liquid, as hereinafter more fully set forth.

Also, mixtures can be used of any two or of the the three sulphate radicle bearing materials, namely, sulphuric acid, alkyl acid sulphate (monoalkyl acid sulphate) and dialkyl sulphate. In the case of a mixture of sulphuric acid with either or both the monoalkyl acid sulphate and the dialkyl sulphate, the sulphuric acid dissolves in the alkyl sulphate and the advantage of using a solvent for the sulphuric acid is obtained together with the advantage gained from the use of an alkyl sulphate.

Other objects and advantages of the present invention will be apparent from the foregoing disclosure of illustrative examples of methods, steps, uses and products of the present invention.

The following are given as examples of phenols which have unsaturated side chains and whose polymerization can be promoted by material selected from the group consisting of dialkyl sulphates and monoalkyl acid sulphates: the so defined phenols obtained from or derived from juices of the Anacardium genus of the Anacardiaceae family including cashew nut shell liquid and its phenolic derivatives such as cardol, anacardic acid, "cardanol" which is a breakdown derivative of anacardic acid, and other phenolic derivatives of the kind defined obtained some in the distillate and some in the residue left after distillation, marking nut shell liquid and its phenolic constituents anacardol and the carboxylic phenols, its phenol distillates and phenol distillate residue having unsaturated side chains; japan lac and its phenol constituents and derivatives including urushiol, distillates and distillate residues; and in general those phenols which have unsaturated side chains and which can be polymerized by concentrated or fuming sulphuric acid.

As examples of dialkyl and monoalkyl acid sulphates suitable for the practice of the methods of the present invention the following are given: dimethyl sulphate, diethyl sulphate, dibutyl sulphate, dipropyl sulphate, diamyl sulphate and the mixed-alkyl sulphates such as ethyl butyl sulphate, butyl amyl sulphate, mono-ethyl acid sulphate, monopropyl acid sulphate, mono-isopropyl acid sulphate and so on.

Illustrative examples of methods of polymerizing cashew nut shell liquid and other materials according to the present invention are as follows:

EXAMPLE I.—(Step 1).—To two tons (4000 pounds) of cashew nut shell liquid in a steel tank about one hundred twenty pounds (3% by weight of the cashew nut shell liquid) of a commercial grade of mono-isopropyl acid sulphate are added and thoroughly mixed with an agitator and the mixture heated by means of steam passed through coils of pipe immersed in the mixture, the agitation being continued during the heating. The heating is carried on until the temperature of the mixture reaches 325° F. which takes about one and one-half hours to two hours in the particular apparatus used for the present example. On reaching the desired temperature the steam is turned off to discontinue the heating. During this heating the mono-isopropyl acid sulphate reacts with metal bearing compounds in the cashew nut shell liquid whereby the metals are precipitated as the sulphate salts. Also, the cashew nut shell liquid is thickened due to the polymerizing action of the mono-isopropyl acid sulphate. On reaching the desired temperature the treated cashew nut shell liquid is drawn from the tank and pumped while still hot through a filter press to remove the precipitated salts, which latter, upon their precipitation remain for some time in suspension in the cashew nut shell liquid, serve as a filter aid in the press and build up a cake through which the cashew nut shell liquid passes. This treated and filtered cashew nut shell liquid, hereinafter called "treated cashew nut shell liquid," upon cooling is liquid and of slightly higher viscosity than commercial untreated cashew nut shell liquid and is stored in tanks for use and is suitable for making varnishes, resins as by reaction with aldehydes, and for other uses for which cashew nut shell liquid is known to be suitable, including further polymerization to various stages including among others the liquid, semi-liquid and rubbery states in which latter state the product is known by the trade-mark name of "Cardolite."

Step 2.—About ten pounds each of water and concentrated sulphuric acid are mixed with an agitator into one thousand pounds of the above "treated cashew nut shell liquid" in a jacketed copper lined kettle and heated by steam to a temperature of about 320° F. where considerable frothing occurs, at which point the steam is turned off and cold water circulated through the jacket to retard further polymerizing reaction. The resulting product can be drawn off for storage or immediate use as soon as the above temperature is used. The product when cooled to normal temperature is a thick liquid and is suitable for the various uses of cashew nut shell liquid including those above noted for "treated cashew nut shell liquid."

Step 3.—A further step for treatment according to the present invention is to let the material of step 2 remain in the kettle and hold until the temperature rises 285° F., which rise will occur with the steam off and cold water flowing through the jacket, at which point about twenty pounds of commercial diethyl sulphate are added and mixed until the temperature reaches 250° F. when the material is drawn from the kettle and into shallow pans for the depth of about three inches. To get a rubber like consistency, the material called "Cardolite," the material in the shallow pans is placed in ovens and cured for about fifteen hours at about 260° F. to 275° F.

EXAMPLE II.—To a given quantity of the "treated cashew nut shell liquid" of step 1 of Example I there is added about two per cent by weight of diethyl sulphate which is stirred in to get a uniform solution of the two. The solution is then heated to bring it up to about 320° F. whereupon the heating is discontinued and the material held until frothing caused by evolution of sulphur dioxide gas subsides, whereupon the material is poured into shallow pans and set in oven to cure for about fifteen hours at about 260° F. to 275° F. The resulting product is a resilient solid, rubber-like in character, and, like the corresponding material of step 3 of Example I above, is known on the market as "Cardolite."

EXAMPLE III.—The phenolic material of this example is the residue remaining after the distillation of cashew nut shell liquid with steam at about 270° F., and is hereinafter in this example called "residue." "Residue" is comprised mostly of phenols having an unsaturated side chain and having a high molecular weight. Into one hundred parts of residue were dissolved five parts by weight of diethyl sulphate and the solution heated to about 160° C. where polymerization produced a strong resinous material resistant to high temperature and an insulation of high voltage and high frequency currents.

EXAMPLE IV.—To one hundred parts by weight of Japanese lac (vernisifera) were added five parts by weight of diethyl sulphate which was stirred in and the solution heated up to about 120° C. until the Japanese lac was polymerized to a ropy consistency when it was set in an oven at about 160° C. for about three hours when it became polymerized and set to a tough, hard resin.

Metal salts are precipitated from Japanese lac by the sulphate radicles and the precipitate can be removed as by filtering before polymerization of the Japanese lac goes beyond the liquid or filterable state.

EXAMPLE V.—Into one hundred parts by weight of cashew nut shell liquid distillation residue, such as is described in Example III, were dissolved about ten parts by weight of diethyl sulphate and the solution heated for about sixteen hours at about 300° F. The reaction product is hard, horny and tough and has good electrical insulating characteristics.

The reaction product of Example III is rubbery in comparison with the product of Example V. Both of these reaction products when produced by heating at about 300° F. to about 320° F., or in that neighborhood, for about sixteen hours have reached their ultimate reaction point and will not materially change in character when heated longer at these temperatures.

The "residue" described for Example III and V can be that obtained by the distillation of raw cashew nut shell liquid or that obtained by the distillation of cashew nut shell liquid from which naturally occurring metals have been removed, as for example by the method of step 1 of Example I above.

The amount of diethyl sulphate used to polymerize cashew nut shell liquid residue can be from about 1% to about 10% of the weight of the residue used and can be varied to suit various needs and conditions to which the product is to be applied.

The polymerization products of cashew nut shell liquid distillation residue of the present invention, as described, and in modifications have many applications of use for example for electrical insulation, for brake and clutch and other friction element facings, for binders for the abrasive materials of grinding wheels and for binders for other uses, for coatings and for linings. One way of modifying the polymerization products of cashew nut shell liquid residue is to condense with reactive methylene group or similar agents and this condensation can be carried on simultaneously with the polymerization step or steps. Examples of condensation reagents useful in this manner are formaldehyde, hexamethylene, paraformaldehyde and other polymers of formaldehyde, acetaldehyde and furfuraldehyde and these are described generally as agents which are aldehydes or which contain a reactive methylene group.

Having thus described my invention, what I claim is:

1. The polymerization reaction products of the residue obtained by the destructive distillation of cashew nut shell liquid with steam to remove from 25% to 75% thereof as distillate and to leave a residue, and heating said residue with from about 1% to about 10% of its weight of dialkyl sulphate to produce polymerization.

2. The polymerization reaction products of the residue obtained by the destructive distillation of cashew nut shell liquid with steam to remove from 25% to 75% thereof as distillate and to leave a residue, and heating said residue with from about 1% to about 10% of its weight of diethyl sulphate to produce polymerization.

SOLOMON CAPLAN.